United States Patent [19]

Pfau

[11] Patent Number: 5,583,773
[45] Date of Patent: Dec. 10, 1996

[54] METHOD FOR FILTERING A WHEEL SPEED SIGNAL

[75] Inventor: Martin Pfau, Weissach, Germany

[73] Assignee: Robert Bosch GmbH, Stuttgart, Germany

[21] Appl. No.: 374,339

[22] Filed: Jan. 18, 1995

[30] Foreign Application Priority Data

Feb. 23, 1994 [DE] Germany ............................ 44 05 801.2

[51] Int. Cl.$^6$ ..................................................... B60T 8/32
[52] U.S. Cl. .................... 364/426.023; 303/167; 303/176
[58] Field of Search ............................. 364/426.02, 565, 364/566; 303/154, 158, 167, 176

[56] References Cited

U.S. PATENT DOCUMENTS

| | | | |
|---|---|---|---|
| 4,497,026 | 1/1985 | Braschel et al. | 364/426.02 |
| 4,718,013 | 1/1988 | Kubo | 364/426 |
| 4,870,582 | 9/1989 | Hoashi et al. | 364/426.02 |
| 5,012,417 | 4/1991 | Watanabe et al. | 364/426.02 |
| 5,099,443 | 3/1992 | Higashimata et al. | 364/565 |
| 5,193,889 | 3/1993 | Schaefer et al. | 303/100 |
| 5,302,010 | 4/1994 | Ehmer et al. | 303/111 |

*Primary Examiner*—Michael Zanelli
*Attorney, Agent, or Firm*—Felfe & Lynch

[57] ABSTRACT

Wheel speed sensor signals are monitored to determine whether physically impossible values of change in wheel speed occur during wheel acceleration. Changes are compared to two different comparison thresholds which are brought into effect alternately depending on whether the wheel is found to be accelerating continuously or not.

4 Claims, 2 Drawing Sheets

METHOD FOR FILTERING A WHEEL SPEED SIGNAL

PRIOR ART

It is known that the signals of the wheel-speed sensor can be disturbed by superimposed additional signals, leading to incorrect determination of the wheel speed.

In known systems (e.g. U.S. Pat. No. 4,497,026, incorporated herein by reference), the wheel speed is calculated from the time between flanks arriving from the sensor in accordance with $$V = \frac{\Delta s}{\Delta t}$$

With a given wheel circumference (about 2 m) and a fixed number of teeth on the sensor wheel (e.g. 48), the following is obtained $$V \approx \frac{1}{\Delta t}$$

The speed calculated directly from the time between incoming flanks is called V-unfiltered.

During a normal anti-lock control operation, it is implausible that wheels will accelerate at more than 50 g (about 500 m/s$^2$). In relation to a program cycle time of, for example, 10 ms, this 50 g corresponds to a speed jump of about 18 km/h.

If there are speed jumps of more than +18 km/h per program cycle in V-unfiltered therefore, the system detects signal disturbance. Such sensor signals are excluded from the calculation of the wheel speed.

The solution described above is not sufficiently sensitive for many signal disturbances (brake squealing, frictional vibrations, chatter, capacitive electric interference).

SUMMARY OF THE INVENTION

The invention allows more sensitive filtering to be achieved.

Moreover, in the prior art a threshold of about 50 g in the wheel dynamics is far exceeded in the case of extreme drive-away maneuvers (e.g. sudden engagement of the clutch, extreme maneuvers involving traction control). As a result, the system erroneously detects signal disturbance. This erroneous detection of a signal disturbance is likewise avoided by the invention.

The low threshold is preferably dependent on the wheel behavior, in particular equal to the filtered wheel acceleration plus an offset.

DESCRIPTION OF THE EXEMPLARY EMBODIMENTS

Figure 1:
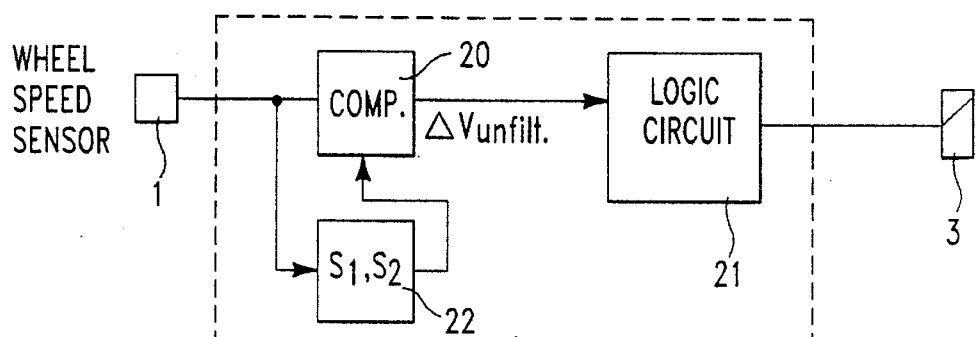
FIG. 1 shows a block diagram of an exemplary embodiment.

In FIG. 1, a wheel-speed sensor 1 supplies its output signal to an evaluation circuit 2 which produces control signals for a brake-pressure control device 3 (e.g. 3/3-way valve). The sensor signal is fed to a device 20 known, for example, from U.S. Pat. No. 4,497,026, FIGS. 2 and 3. Here, a wheel-acceleration or wheel speed signal $\Delta V_{unfilt}$ is derived from the wheel-speed signal and this acceleration signal is compared there with a threshold $b_{max}$ (e.g. 50 g). If this threshold is exceeded, then an error memory is set and this then prevents the measured sensor signal from being evaluated as a speed signal. Instead, an equivalent signal is produced, e.g. the last signal obtained is used again. For the sake of simplicity, only one sensor and one valve are depicted in FIG. 1. The undisturbed sensor signal or the equivalent signal is then fed to a logic circuit 21 which produces the trigger signal for the valve 3 by known methods.

In the invention, the sensor signal is also fed to a block 22 which ascertains whether a continuous wheel acceleration is present. Depending on whether a continuous wheel acceleration has been found to be present or not, an output signal is produced, and this is fed to block 20. According to the invention, this block 22 contains threshold $S_1$ and $S_2$. The signal from block 22 then provides block 20 with one of the two thresholds which is used to ascertain whether a disturbed signal is present.

Figure 2:
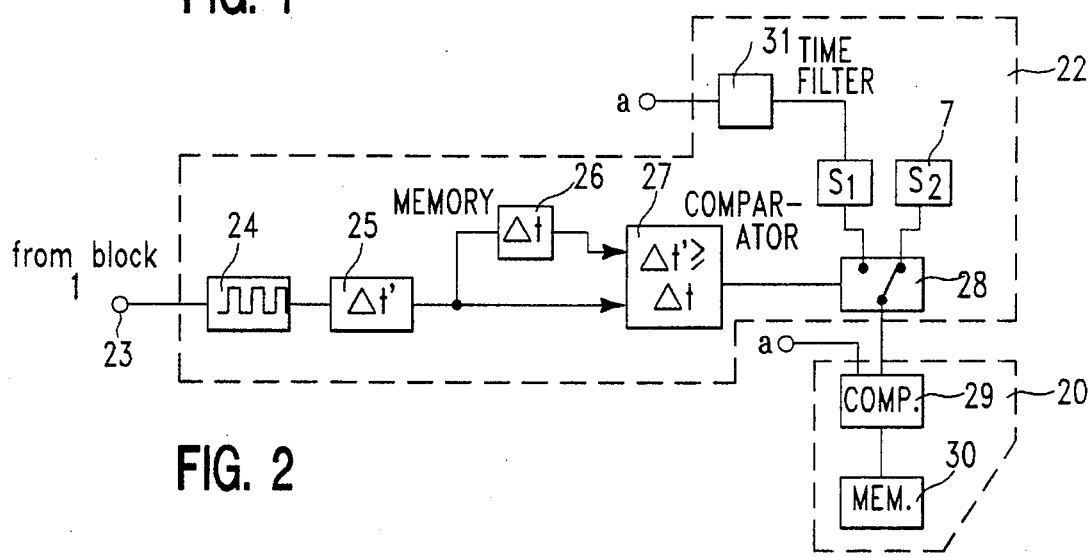
FIGS. 2 and 3 show alternatives for the detection of continuous wheel acceleration and FIGS. 4 and 5 show diagrams for the purpose of illustration.

Block 22 can be constructed as shown in FIG. 2. The sensor signal is in the form of a rectangular wave which is fed in at a terminal 23 and sampled at high frequency in a block 24. A block 25 measures the interval $\Delta t'$ from the last flank of the rectangular wave to the current time. The interval $\Delta t$ between the two last flanks of the rectangular wave is stored in a memory 26. A comparator 27 compares $\Delta t'$ with $\Delta t$ and emits an output signal as soon as $\Delta t'$ becomes equal to or greater than $\Delta t$. This indicates that the wheel acceleration is not continuous. The output signal switches over a switch 28 which then applies a low threshold $S_1$ to the comparator 29 instead of the high threshold $S_2$. The comparator 29 corresponds to the comparator 16 in U.S. Pat. No. 4,497,026. It compares the unfiltered wheel acceleration a ($\Delta V_{unfilt}$) per unit time with the threshold $S_1$ and, if the latter is exceeded, sets an error memory 30. The low threshold $S_1$ can be dimensioned as follows, for example:

$$S_1 = a_{filt} + \text{offset (offset e.g. 20 g); } (a_{filt} = \Delta V_{filt})$$

$a_{filt}$ is the wheel acceleration filtered in a time filter 31.

Without the changeover described, threshold $S_2$ is operative, this threshold being very high. It can, for example, be 100 g. If the next flank is reached during the measurement of $\Delta t'$ the $\Delta t'$ value is stored as a new $\Delta t$ in the memory 26 and the measurement of a new $\Delta t'$ is started.

Figure 3:
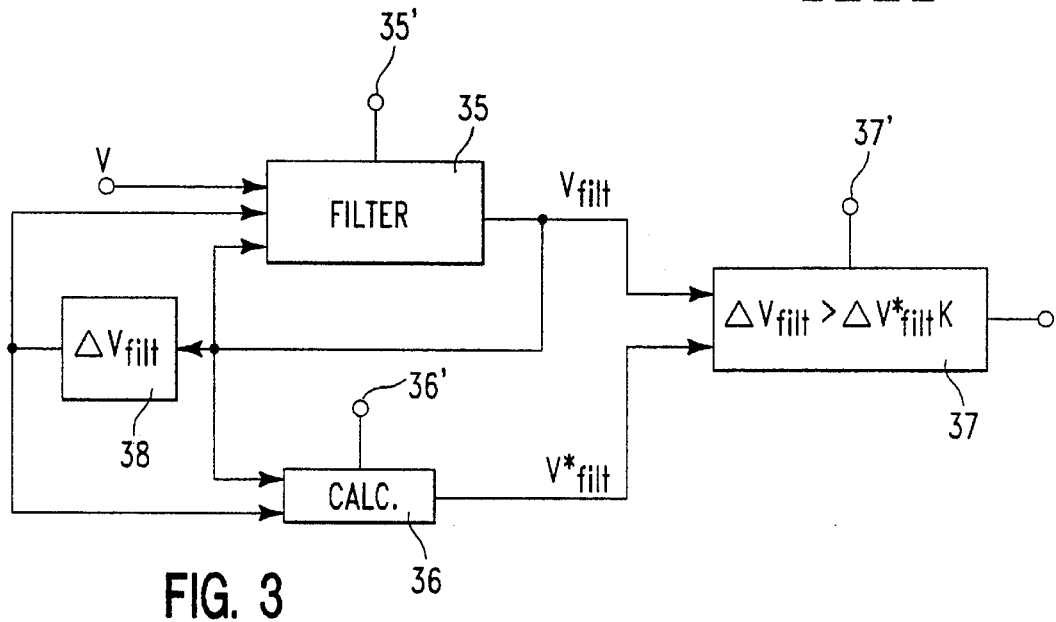

FIG. 3 shows another exemplary embodiment for the detection of a continuous wheel acceleration. Here, the sensor signal V is fed to a filter 35, thereby producing a time-filtered signal $V_{filt}$ at its output. This is accomplished by high-frequency sampling (e.g. 1 kHz) (terminal 35') of the unfiltered speed ($\Delta T$ in FIGS. 4 and 5) and correction of the signal in the filter limits. To determine the filter limits, the filter 35 is fed its filtered output signal $V_{filt}$ to determine the starting points of the filter limits. The specified slope could be constant but is preferably variable and dependent on the slope $\Delta V_{filt}$ of the preceding cycle (block 38). As a function of the input signals, the V curves obtained at the output of the filter 35 correspond to the dotted curves of FIGS. 4 and 5.

The variables $V_{filt}$ and $\Delta V_{filt}$ are likewise fed to a simulation block 36. From these variables, said block 36 calculates a maximum possible filter output value $V^*_{filt}$ in accordance with the maximum permissible slope. In a comparison block 37 it is established how far $V_{filt}$ differs from the theoretically determined maximum value $V^*_{filt}$. If the increase $\Delta V_{filt}$ of $V_{filt}$ within one cycle (terminal 37') (the cycle is here a low-frequency cycle of, for example, 100 Hz, e.g. $T_2-T_1$) is smaller by a given difference (e.g. 30%) than the corresponding value $\Delta V^*_{filt}$ of $V^*_{filt}$ ($\Delta V_{filt} < \Delta V^*_{filt} \cdot K$; K being, for example, 0.7), it is concluded from this that the wheel acceleration is not continuous with a steep slope and an output signal of block 37 is produced, effecting a changeover to the lower threshold $S_1$ in accordance with FIG. 2.

Figure 4:
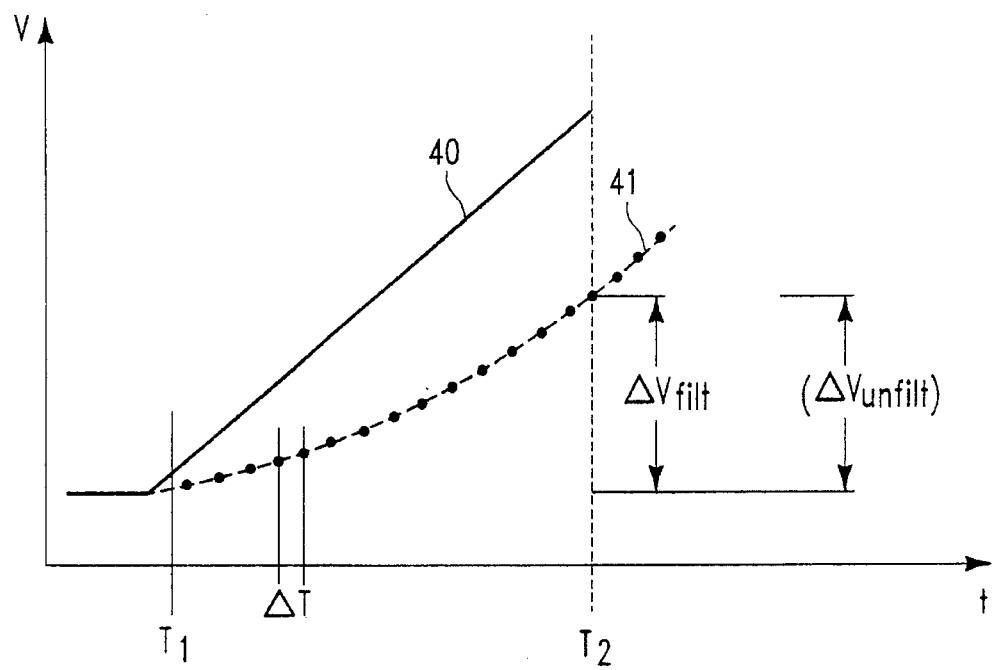

In the case of a continuous wheel acceleration, the relationships are as depicted in FIG. 4, in which 40 denotes the actual wheel acceleration and 41 denotes the time-filtered wheel acceleration. The plotted $\Delta V_{filt}$ is obtained between the time values T1 and T2 ($\Delta t$). For $\Delta V_{unfilt}$ the mean value ($\Delta V_{unfilt}$) is obtained. It can be seen that the difference between these values is small. The error memory is not set.

Figure 5:
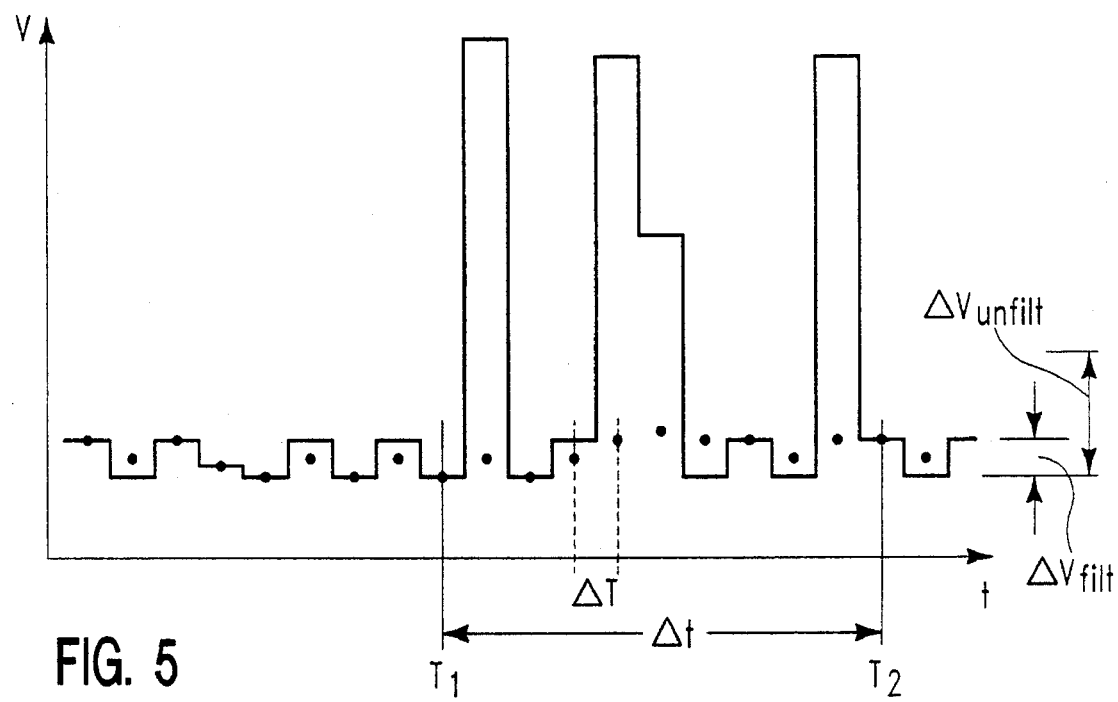

If a disturbed wheel signal is present, the relationships are as depicted in FIG. 5; here, the plotted values for $\Delta V_{filt}$ (dotted curve) and $\Delta V_{unfilt}$ (solid line) are obtained for the section T1 to T2. Here the difference is much greater.

I claim:

1. Method for preventing locking of brakes at the wheels of a vehicle, said method comprising generating sensor signals by means of wheel speed sensors at the wheels, producing brake pressure control signals based on at least said sensor signals, varying brake pressure in response to said brake pressure control signals, determining a wheel speed change magnitude based on said sensor signals, determining whether a continuous wheel acceleration is present, comparing said wheel speed change magnitude to a high positive change threshold when a continuous wheel acceleration is present and to a low positive change threshold when a continuous wheel acceleration is not present, and preventing said control signals from being based on said sensor signals when one of said first and second thresholds is exceeded.

2. Method as in claim 1 wherein said brake pressure control signals are based on an equivalent sensor signal when one of said first and second thresholds is exceeded.

3. Method as in claim 2 wherein said equivalent sensor signal is the last sensor signal generated before one of said first and second thresholds was exceeded.

4. Method as in claim 2 wherein said sensor signals are in the form of rectangular waves having flanks which are sampled at high frequency, the presence of a discontinuous wheel acceleration being determined by comparing the time interval $\Delta t$ between the last two sampled flanks to an interval $\Delta t'$ between the last flank and the current time value t, a discontinuous wheel acceleration being present when $\Delta t'$ is greater than or equal to $\Delta t$.

* * * * *